United States Patent [19]

Iwanami et al.

[11] Patent Number: 5,693,708

[45] Date of Patent: Dec. 2, 1997

[54] COLORED STRETCHED POLYETHYLENE MATERIAL AND PROCESS FOR PRODUCING THE SAME

[75] Inventors: Yoshimu Iwanami; Seizo Kobayashi; Takashi Mizoe; Osamu Otsu, all of Yokohama, Japan

[73] Assignee: Nippon Oil Co., Ltd., Tokyo, Japan

[21] Appl. No.: 433,954

[22] Filed: May 4, 1995

Related U.S. Application Data

[60] Continuation of Ser. No. 137,225, Oct. 18, 1993, abandoned, which is a division of Ser. No. 732,914, Jul. 19, 1991, abandoned.

[30] Foreign Application Priority Data

Jul. 19, 1990 [JP] Japan ................................ 2-189474

[51] Int. Cl.$^6$ .................................................... C08L 23/06
[52] U.S. Cl. .................... 524/585; 264/289.3; 264/291; 264/320; 526/348.1
[58] Field of Search ........................ 264/289.3, 291, 264/320; 524/585; 526/348.1

[56] References Cited

U.S. PATENT DOCUMENTS

| | | | |
|---|---|---|---|
| 4,436,689 | 3/1984 | Smith et al. | 526/348.1 |
| 4,824,619 | 4/1989 | Okada et al. | 264/40.1 |
| 4,879,076 | 11/1989 | Sano et al. | 526/348.1 |
| 4,927,871 | 5/1990 | Ohori et al. | 524/230 |
| 4,996,011 | 2/1991 | Sano et al. | 526/348.1 |
| 5,004,778 | 4/1991 | Waagen et al. | 524/474 |
| 5,066,755 | 11/1991 | Lemstra | 526/348.1 |

FOREIGN PATENT DOCUMENTS

| | | |
|---|---|---|
| 0 137 449 | 4/1985 | European Pat. Off. . |
| 0 376 423 | 7/1990 | European Pat. Off. . |
| 0 410 384 A2 | 1/1991 | European Pat. Off. . |
| 1 234 380 | 7/1959 | Germany . |

OTHER PUBLICATIONS

*Webster's II New Riverside University Dictionary*, Houghton Mifflin Co., 1984, p. 283.
*Webster's II New Riverside University Dictionary*, Houghton Mifflin Co., Boston, 1984, pp. 412, 890.
Database WPIL, Section Ch, Week, 11, Derwent Publications Ltd., London, GB; Class A, An 90–078616 & JP–A–02 030 514 (Mitsui Petrochem) 31 Jan. 1990.

*Primary Examiner*—Romulo H. Delmendo
*Attorney, Agent, or Firm*—Oblon, Spivak, McClelland, Maier & Neustadt, P.C.

[57] ABSTRACT

The present invention discloses a colored stretched polyethylene material which comprises an ultra-high-molecular-weight polyethylene having an intrinsic viscosity of 5–50 dl/g in decalin at 135° C. and 0.001–50 parts by weight, per 100 parts by weight of the polyethylene, of a dye and/or a pigment and which has been stretched at a temperature lower than the melting point of the polyethylene, and a process for producing said polyethylene material. This colored stretched polyethylene material has a tensile modulus of 120 Gpa or more and a tensile strength of 1.5 GPa or more.

9 Claims, 1 Drawing Sheet

5,693,708

1

COLORED STRETCHED POLYETHYLENE MATERIAL AND PROCESS FOR PRODUCING THE SAME

This application is a Continuation of application Ser. No. 08/137,225, filed on Oct. 18, 1993, now abandoned, which is a division of application Ser. No. 07/732,914, filed Jul. 19, 1991, abondoned.

BACKGROUND OF THE INVENTION

1. Field of the Invention

The present invention relates to a colored stretched polyethylene material and a process for producing the polyethylene material. More particularly, the present invention relates to a colored stretched polyethylene material of high strength and high modulus, obtained by processing an ultra-high-molecular-weight polyethylene powder and a dye and/or a pigment under particular conditions, as well as to a process for producing the polyethylene material.

2. Description of the Prior Art

Coloring of general-purpose polyolefin resins such as polyethylene and the like has generally been carried out by a method of mixing a polyolefin with a dye, a pigment or the like and kneading the mixture at a temperature higher than the melting point of the polyolefin by the use of an extruder, a Banbury mixer or the like.

Ultra-high-molecular-weight polyolefins, however, have an extremely high molecular weight and accordingly have a very high melt viscosity, making it hard to subject them to melt kneading. As a result, it has been difficult to obtain a colored ultra-high-molecular-weight polyolefin according to the above conventional method.

Further, coloring of stretched ultra-high-molecular-weight polyolefin materials by immersion in a solution containing a dye, a pigment or the like has had such problems that there occurs no effective infiltration of dye or pigment into stretched polyolefin material, making sufficient coloring difficult.

Meanwhile, ultra-high-molecular-weight polyolefins, as compared with general-purpose polyolefins, have a far higher molecular weight; accordingly, if they can be orientated to a high degree, it is possible to obtain from them a molded material having a high strength and a high modulus. Therefore, various studies have been made to obtain an ultra-high-molecular-weight polyolefin material having a high orientation degree. Such studies include, for example, a method of preparing a dilute solution of an ultra-high-molecular-weight polyolefin dissolved in a solvent such as xylene, decalin, kerosene or the like, subjecting the solution to cooling or isothermal crystallization to obtain a single-crystal mat of the polyolefin, and subjecting the mat to solid-state extrusion, stretching or the like. This method has had a problem that a large amount of a solvent is required for preparation of a single-crystal mat.

The present inventors had previously proposed a process for producing a polyolefin material of high strength and high modulus by compression-molding an ultra-high-molecular-weight polyolefin powder at a temperature lower than the melting point of the polyolefin powder without dissolving or melting the polyolefin powder, and then rolling and stretching the compression-molded product [Japanese Patent Application Kokai (Laid-Open) Nos. 41512/1988 and 66207/1988]. The present inventors had also proposed improved methods for the above compression molding step in Japanese Patent Application No. 32041/1988, etc.

2

SUMMARY OF THE INVENTION

The present inventors made study in order to solve the problems of the prior art and develop a colored polyolefin material of high strength and high modulus. As a result, the present inventors found a coloring method which is entirely different from those employed conventionally and which can provide a colored polyolefin material of high strength and high modulus. The present invention has been completed based on the finding.

Therefore, the objects of the present invention are to provide a colored stretched ultra-high-molecular-weight polyethylene material and a process for producing such a polyethylene material.

The present invention resides in a colored stretched polyethylene material which comprises an ultra-high-molecular-weight polyethylene having an intrinsic viscosity of 5–50 dl/g in decalin at 135° C. and 0.001–50 parts by weight, per 100 parts by weight of the polyethylene, of a dye and/or a pigment and which has been stretched at a temperature lower than the melting point of the polyethylene.

The present invention further resides in a process for producing a colored stretched polyethylene material, which comprises mixing 100 parts by weight of an ultra-high-molecular-weight polyethylene powder having an intrinsic viscosity of 5–50 dl/g in decalin at 135° C. with 0.001–50 parts by weight of a dye and/or a pigment, compression-molding the resulting mixture at a temperature lower than the melting point of the ultra-high-molecular-weight polyethylene powder, and stretching the compression-molded product at a temperature lower than said melting point, as well as in a process for producing a colored stretched polyethylene material, which comprises mixing 100 parts by weight of an ultra-high-molecular-weight polyethylene powder having an intrinsic viscosity of 5–50 dl/g in decalin at 135° C., with 0.001–50 parts by weight of a dye and/or a pigment, compression-molding the resulting mixture at a temperature lower than the melting point of the ultra-high-molecular-weight polyethylene powder, rolling the compression-molded product at a temperature lower than said melting point, and stretching the rolled product at a temperature lower than the melting point.

DETAILED DESCRIPTION OF THE INVENTION

Figure 1:
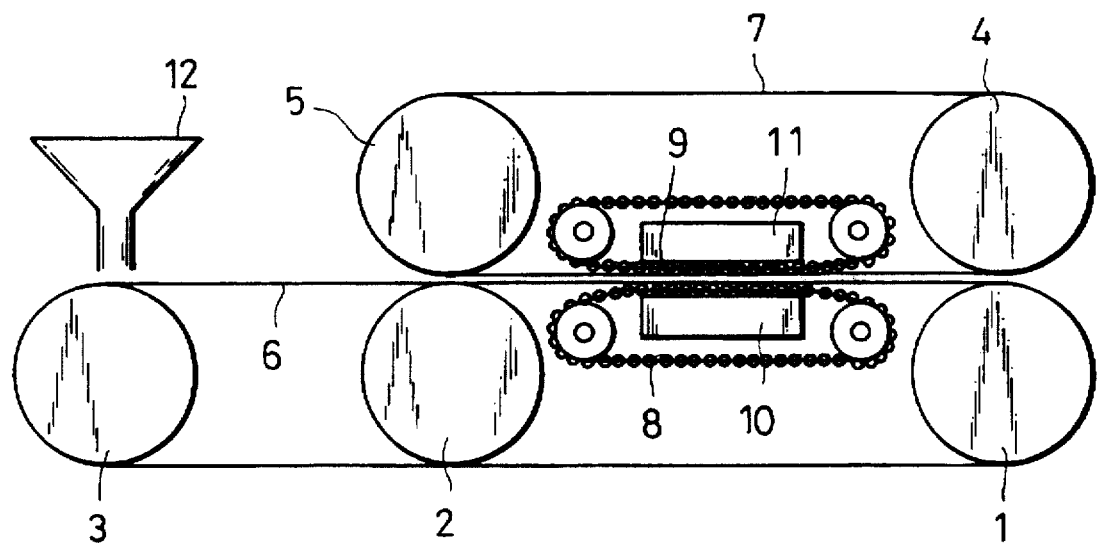
FIG. 1 is a schematic illustration showing an example of the compression molding apparatus used in the practice of the present invention.

The ultra-high-molecular-weight polyethylene used for production of the colored stretched polyethylene material of the present invention has an intrinsic viscosity as measured in decalin at 135° C., of 5–50 dl/g, preferably 8–40 dl/g, more preferably 10–30 dl/g. This viscosity corresponds to a viscosity-average molecular weight of 500,000–12,000,000, preferably 900,000–9,000,000, more preferably 1,200,000–6,000,000.

When the intrinsic viscosity of the polyethylene is lower than 5 dl/g, the stretched material obtained has inferior mechanical properties. When the intrinsic viscosity is higher than 50 dl/g, processability in carrying out compression molding, rolling and stretching is poor.

The form of the ultra-high-molecular weight polyethylene is not particularly restricted, but a granular or powdery form is preferred generally. The average particle diameter is desired to be 2,000 µm or less, preferably 1–2,000 µm, more preferably 10–1,000 µm. The narrow particle diameter distribution is preferable because it gives a homogeneous sheet or film low in defects, in compression molding. A polyethylene of large particle diameter can be ground by a known method so as to have an average particle diameter as mentioned above.

The ultra-high-molecular-weight polyethylene having the above-mentioned properties, used in the present invention is obtained by homopolymerizing ethylene or copolymerizing ethylene and an α-olefin in the presence of a catalyst which is a combination of a catalyst component and an organometal compound used as necessary.

As the α-olefin, there can be used those of 3–12 carbon atoms, preferably 3–6 carbon atoms. Specifically, there can be mentioned propylene, butene-1, 4-methylpentene-1, hexene-1, octene-1, decene-1, dodecene-1, etc. Of these, particularly preferable are propylene, butene-1, 4-methylpentene-1 and hexene-1. It is possible to further use, as comonomers, dienes such as butadiene, 1,4-hexadiene, vinylnorbornene, ethylidene-norbornene and the like. The content of α-olefin in ethylene-α-olefin copolymer is 0.001–10 mole %, preferably 0.01–5 mole %, more preferably 0.1–1 mole %.

The polymerization catalyst used for production of the ultra-high-molecular-weight polyethylene is a combination of a catalyst component and an organometal compound used as necessary.

The catalyst component is a compound containing at least one transition metal of groups IV to VI of the periodic table. Specific examples of such a compound are preferably (1) titanium compounds, (2) vanadium compounds, (3) chromium compounds and (4) zirconium compounds or hafnium compounds. These compounds may be used in combination of two or more.

As the titanium compounds (1), there can be mentioned halides, alkoxyhalides, alkoxides, oxyhalides, etc. of titanium. Tetravalent titanium compounds and trivalent titanium compounds are preferred. As specific examples of the tetravalent titanium compounds, there can be mentioned those represented by the following general formula

(R represents an alkyl group of 1–20 carbon atoms, preferably 1–12 carbon atoms, or an aralkyl group; X represents a halogen atom; and $0 \leq n \leq 4$). Titanium tetrachloride is particularly preferable.

As the trivalent titanium compounds, there can be mentioned titanium trihalides such as titanium trichloride and the like. Also, there can be mentioned trivalent titanium compounds obtained by reducing an alkoxytitanium halide (titanium:tetravalent) represented by the general formula

(R represents an alkyl group of 1–20 carbon atoms, an aryl group or an aralkyl group; X represents a halogen atom; and $0 \leq m \leq 4$) with an organometal compound of a metal of groups I to III of the periodic table. Specific examples are $Ti(OCH_3)Cl_2$, $Ti(OCH_3)_2Cl$, $Ti(OC_2H_5)Cl_2$, $Ti(OC_2H_5)_2Cl$ and $TiCl_3$.

Of the above titanium compounds, tetravalent titanium compounds are particularly preferable.

As the vanadium compounds (2), there can be mentioned halides, alkoxyhalides, alkoxides, oxyhalides, etc. of vanadium. Specifically, there can be mentioned tetravalent vanadium compounds such as vanadium tetrahalides (e.g. vanadium tetrachloride), tetraethoxyvanadium and the like; pentavalent vanadium compounds such as vanadium oxytrichloride, ethoxy dichloro vanadyl, triethoxy vanadyl, tributoxy vanadyl and the like; and trivalent vanadium compounds such as vanadium trichloride, vanadium triethoxide and the like.

Also, there can be used compounds obtained by treating the above titanium compound or vanadium compound with at least one electron-donating compound.

As the electron-donating compound, there can be mentioned ethers, thioethers, thiolphosphines, stibines, arsines, amines, amides, ketones, esters, etc.

The titanium compound or vanadium compound may be used in combination with a magnesium compound. The magnesium compound includes metallic magnesium, magnesium hydroxide, magnesium carbonate, magnesium oxide, magnesium fluoride, magnesium chloride, magnesium bromide, magnesium iodide, etc. The magnesium compound further includes double salts, double oxides, carbonates, chlorides, hydroxides, etc. containing magnesium atom and a metal selected from silicon, aluminum and calcium. The magnesium compound furthermore includes those compounds obtained by treating or reacting the above inorganic solid compound with an oxygen-containing compound, a sulfur-containing compound, an aromatic hydrocarbon or a halogen-containing substance, and also includes substances obtained by allowing a silicon- or aluminum-containing oxide to contain the above magnesium compound.

Examples of the oxygen-containing compound are water; oxygen-containing organic compounds such as alcohols, phenols, ketches, aldehydes, carboxylic acids, esters, polysiloxanes, acid amides and the like; metal alkoxides; oxygen-containing inorganic compounds such as metal oxychlorides and the like. Examples of the sulfur-containing compound are sulfur-containing organic compounds such as thiols, thioethers and the like; and inorganic sulfur compounds such as sulfur dioxide, sulfur trioxide, sulfuric acid and the like. Examples of the aromatic hydrocarbon are monocyclic or polycyclic aromatic hydrocarbon compounds such as benzene, toluene, xylene, anthracene, phenanthrene and the like. Examples of the halogen-containing substance are chlorine and compounds such as hydrogen chloride, metal chlorides, organic halides and the like.

In using the magnesium compound together with the titanium or vanadium compound, the method of their use has no particular restriction, and a known method can be employed.

As other example of the catalyst system using the titanium compound and the magnesium compound, there can be mentioned a catalyst system using in combination (a) a reaction product between an organomagnesium compound (e.g. Grignard compound) and a titanium compound and (b) an organoaluminum compound.

As still other example of the catalyst system using the titanium or vanadium compound and the magnesium compound, there can be mentioned a catalyst system using in combination (a) a solid substance obtained by contacting an inorganic oxide (e.g. $SiO_2$ or $Al_2O_3$) with a solid catalyst component containing at least magnesium or titanium and (b) an organoaluminum compound.

In these catalyst systems, as the titanium compound, there can be used an addition product between titanium and an organic carboxylic acid ester, or a product obtained by contacting the magnesium-containing inorganic solid compound mentioned above, with an organic carboxylic acid ester. Also, the organoaluminum compound may be used in the form of an adduct with an organic carboxylic acid ester. Also, a catalyst system prepared in the presence of an organic carboxylic acid ester can be used in all cases.

As the chromium compounds (3), there can be specifically mentioned so-called Phillips catalysts obtained by allowing an inorganic oxide carrier to support chromium trioxide or a compound capable of at least partially forming a chromium oxide when fired. As the inorganic oxide carrier, there can be mentioned silica, alumina, silica-alumina, titania, zirconia, thoria and mixtures thereof. Silica and silica-alumina are preferable.

The chromium compound to be supported includes chromium oxides and compounds capable of at least partially forming a chromium oxide when fired, such as halides, oxyhalides, nitrate, acetate, sulfate, alcoholates and the like of chromium. Specific examples are chromium trioxide, chromyl chloride, potassium dichromate, ammonium chromate, chromium nitrate, chromium acetate, chromium acetylacetonate, ditertiarybutyl chromate and the like.

In order to allow the carrier to support the chromium compound, there can be used a known method such as immersion, solvent removal by distillation, sublimation and the like. An appropriate method is selected so as to meet the type of the chromium compound used. The amount of chromium supported is 0.1–10% by weight, preferably 0.3–5% by weight, more preferably 0.5–3% by weight in terms of weight % of chromium atom based on the carrier.

The chromium compound-supporting carrier is fired to activate. The firing is carried out generally in a non-reducing atmosphere containing substantially no moisture, for example, in the presence of oxygen. It may be carried out in the presence of an inert gas or under reduced pressure. Dry air is used preferably. The firing is carried out at a temperature of 450° C. or higher, preferably 500°–900° C. for several minutes to several hours, preferably 0.5–10 hours. Preferably, dry air is sufficiently fed during firing to effect activation in a fluid condition.

During the step of supporting or firing, a known method for activity control may be employed by addition of titanate or fluorine-containing salt.

The chromium-supporting catalyst may be reduced, before use, with carbon monoxide, ethylene, organoaluminum or the like.

As the zirconium compounds or hafnium compounds (4), there can be mentioned, for example, zirconium compounds or hafnium compounds containing, as a ligand, a compound having conjugated π-electrons. Such compounds are represented by the following general formula $$R^1{}_aR^2{}_bMR^3{}_cR^4{}_d$$

(M represents a zirconium or hafnium atom; $R^1$, $R^2$, $R^3$ and $R^4$ each represent a hydrocarbon group of 1–20 carbon atoms, a halogen atom or a hydrogen atom; at least one of $R^1$, $R^2$, $R^3$ and $R^4$ is a hydrocarbon group; a, b, c and d satisfy a condition of a+b+c+d=4). In the above formula, the hydrocarbon group is preferably an alkyl group, an aryl group, a cycloalkyl group, an aralkyl group, an alkoxy group, a cycloalkadienyl group, a sulfur-containing hydrocarbon group, a nitrogen-containing hydrocarbon group or a phosphorus-containing hydrocarbon group.

Examples of the alkyl group are methyl, ethyl, propyl, isopropyl, butyl, hexyl, octyl, 2-ethylhexyl, decyl and oleyl. Examples of the aryl group are phenyl and tolyl. Examples of the cycloalkyl group are cyclopentyl, cycclohexyl, cyclooctyl, norbornyl and bicyclononyl. Examples of the aralkyl group are benzyl and neophyl.

Examples of the cycloalkadienyl group are cyclopentadienyl, methylcyclopentadienyl, ethylcyclopentadienyl, dimethylcyclopentadienyl, indenyl and tetrahydroindenyl. Examples of the alkoxy group are methoxy, ethoxy, propoxy and butoxy. Examples of the sulfur-containing hydrocarbon group are thioethyl and thiophenyl. Examples of the nitrogen-containing hydrocarbon group are dimethylamide, diethylamide and dipropylamide.

As the hydrocarbon group, there can also be mentioned unsaturated aliphatic groups such as vinyl, allyl, propenyl, isopropenyl, 1-butenyl and the like; and unsaturated alicyclic groups such as cyclohexenyl and the like. As the halogen atom, there can be mentioned, for example, fluorine, chlorine and bromine.

The zirconium or hafnium compound can also be used by being supported by the above-mentioned inorganic oxide carrier.

The organometal compound which can be used in combination with the above catalyst component, includes organometal compounds of a metal of groups I to IV of the periodic table, known as a component of Ziegler type catalysts. Particularly preferable compounds are organoaluminum compounds represented by the general formula $$R_nAlX_{3-n}$$

(R is an alkyl group of 1–20 carbon atoms, an aryl group or an alkoxyl group; X is a halogen atom; n is an integer of 0<n≦3; when n≧2, R's may be the same or different), and organozinc compounds represented by the general formula $$R_2Zn$$

(two R's are each an alkyl group of 1–20 carbon atoms and may be the same or different). These compounds may be used in combination.

Examples of the organoaluminum compounds are triethylaluminum, triisobutylaluminum, tri-n-hexylaluminum, diethylaluminum chloride, monoethoxydialkylaluminums and diethoxymonoalkylaluminums. Also, there can be used compounds obtained by reaction between trialkylaluminum and water and represented by the following general formula

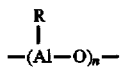

represents a hydrocarbon group of 1–18 carbon atoms; n is an integer of 2≦n≦100, preferably 2≦n≦50).

The amount of organoaluminum compound used is not particularly restricted, but generally is 0.1–1,000 moles per mole of the transition metal compound.

The polymerization reaction is carried out in a gas phase substantially free from oxygen, water, etc., or in the presence of a solvent inert to the catalyst used, or using the monomer (s) per se as a solvent.

As the inert solvent, there can be used, for example, aliphatic hydrocarbons such as butane, isobutane, pentane, hexane, octane, decane, dodecane and the like; alicyclic hydrocarbons such as cyclopentane, cyclohexane and the like; aromatic hydrocarbons such as benzene, toluene and the like; and petroleum distillates.

The polymerization temperature is controlled at a temperature lower than the melting point of an ultra-highmolecular-weight polyethylene to be formed. It is generally −20°–110° C., preferably 0°–90° C.

When the polymerization temperature is higher than the melting point of an ultra-high-molecular-weight polyethylene to be formed, it is impossible to stretch the ultra-high-molecular-weight polyethylene obtained to a stretch ratio of 20 or more in the later stretching step.

Desirably, the polymerization pressure is generally 0–70 k/cm$^2$G, preferably 0–60 kg/cm$^2$G.

Control of molecular weight is possible by varying polymerization conditions such as polymerization temperature, polymerization pressure, catalyst type, molar ratio of catalyst components, hydrogen addition to polymerization system, and the like.

As a matter of course, it is possible to employ, without any problem, a polymerization process wherein polymerization conditions such as hydrogen concentration, polymerization temperature and the like are varied in two or more stages during polymerization.

An ultra-high-molecular-weight polyethylene of powdery state can be obtained under the above production conditions, for example.

In the present invention, the thus obtained ultra-high-molecular-weight polyethylene is mixed with a dye and/or a pigment.

The dye or pigment used in the present invention is not particularly restricted. Various dyes and pigments generally used in coloring of resins, fibers, etc. can be used. Preferable examples of the dyes are azo dyes, anthraquinone dyes, aminoketone dyes, indigoid dyes, indamine dyes, indophenol dyes, azine dyes, oxazine dyes, oxyketone dyes, thiazine dyes, sulfur dyes, triphenylethane dyes, triarylmethane dyes, xanthene dyes, quinoline dyes, pyrazolone dyes, stilbene dyes, diphenylmethane dyes, xanthene dyes, alizarine dyes, acridine dyes, quinone imine dyes, thiazole dyes, methine dyes, polymethine dyes, nitro dyes, nitroso dyes and phthalocyanine dyes. The pigments used in the present invention are divided into two main groups, i.e. organic pigments and inorganic pigments. The organic pigments include those of nitroso type, nitro type, azo type, phthalocyanine type, basic dye type, acid dye type, vat dye type, mordant dye type, etc. Specific examples are Hanza Yellow, Benzidine Yellow, Benzidine Orange, C.P. Toluidine Red Med, C.P. Para Pred Lt, Chlorinated Para Red, Ba Lithol Toner, Lithol Rubine, Permanent Red 2B, BON Red DK, BON Maroon Lt, Pigment Scarlet Lake, Maddar Lake, Thioindigo Red, Pyrazolone Red, Dibenzanethylone Violet, Helio Fast Ruby, Phthalocyanine Blue, Phthalocyanine Green, Indanthrene Blue, Queen Acridone, Fast Yellow, Brilliant Carmine 6B, Lake Red, Lake Bordeaux and Fast Sky Blue. The inorganic pigments include chromic acid, ferrocyanides, sulfides, sulfates, oxides, hydroxides, silicates, carbon, etc. Specific examples are cobalt pigments such as aureolin, cobalt green, cerulean blue, cobalt blue, cobalt violet and the like; iron pigments such as ochre, sienna, red iron oxide, Prussian blue and the like; chromium pigments such as chromium oxide, chrome yellow, viridian and the like; manganese pigments such as mineral violet and the like; copper pigments such as emerald green and the like; vanadium pigments such as vanadium yellow, vanadium blue and the like; mercury pigments such as vermilion and the like; lead pigments such as red lead and the like; sulfide pigments such as cadmium yellow, ultramarine and the like; and selenide pigments such as cadmium red and the like. Of the above dyes and pigments, those which are solid preferably have particle diameters of several microns to several tens of millimicrons and their shapes can be spherical, massive, bar-like, acicular, flaky, etc. As a matter of course, the dye and/or pigment used in the present invention also includes fluorescent dyes and fluorescent pigments. Desirably, particle diameters are preferably 1/100,000 to 10 times, more preferably 1/1,000 to 1 time the particle diameter of the ultra-high-molecular-weight polyethylene powder to be mixed therewith, in view of dispersibility, operability, etc.

These dyes and pigments can be used alone or in admixture.

Next, description is made on the process for producing a colored stretched polyethylene material using the ultra-high-molecular-weight polyethylene and the dye and/or the pigment all mentioned above.

In the present invention, first the ultra-high-molecular-weight polyethylene powder is mixed with the dye and/or the pigment.

The desirable mixing ratio of the ultra-high-molecular-weight polyethylene powder and the dye and/or the pigment is 0.001 to 50 parts by weight, preferably 0.01–10 parts by weight, more preferably 0.01–5 parts by weight of the dye and/or the pigment per 100 parts by weight of the polyethylene powder.

The mixing method is not particularly restricted. The mixing can be carried out by any of dry powder mixing, wet mixing in slurry form, mixing in the presence of a solvent, etc. When the mixing is carried out in a slurry or a solvent, the solvent is desirably a poor solvent to the ultra-high-molecular-weight polyethylene powder. In the present invention, dry powder mixing is particularly preferable from the standpoint of workability.

The apparatus used for mixing is not particularly restricted, and there can be used a known mixer such as tumbler, v-shaped mixer, drum mixer, ribbon mixer or the like. The temperature used in mixing is not particularly restricted as long as it is lower than the melting point of the ultra-high-molecular-weight polyethylene powder. Desirably, the temperature is generally 0° C. to lower than the melting point of the polyethylene, preferably 5°–135° C. In the case of dry powder mixing, the temperature is desirably 0°–40° C. Incidentally, the melting point of the ultra-high-molecular-weight polyethylene powder is measured by a known method, but may also be determined from the peak temperature observed using a DSC apparatus.

The mixing time differs by the temperature and the type of the dye and/or the pigment used in mixing, but desirably is generally at least one minute, preferably 3 minutes to 20 hours, more preferably 5 minutes to 10 hours, particularly preferably 10 minutes to 1 hour. The mixing can be carried out continuously or intermittently.

The above mixing provides a mixture of the ultra-high-molecular-weight polyethylene powder with the dye and/or the pigment. When the mixture is obtained by so-called wet mixing such as mixing in slurry form or mixing in the presence of a solvent, it is desirable that the liquid present in the mixture be substantially removed.

In the present invention, the mixture can further contain various additives. Such additives include a dispersant for pigment (e.g. lecithin, phenylmethylsilicone), an antioxidant, a light stabilizer, etc.

In the present invention, the thus prepared mixture of the ultra-high-molecular-weight polyethylene powder with the dye and/or the pigment is then compression-molded at a temperature lower than the melting point of the polyethylene powder, and the compression-molded product is stretched at a temperature lower than said melting point to obtain a colored stretched polyethylene material of the present invention.

The colored stretched polyethylene material of the present invention can also be obtained by subjecting the above-mentioned mixture to compression molding, rolling and stretching in this order.

The method of compression molding is not particularly restricted and can be batchwise or continuous. Batchwise compression molding can be carried out by the use of an apparatus of slide type, rotary type or the like. Continuous compression molding can be carried out by various methods. It can be effected by, for example, holding the above-mentioned mixture between a pair of endless belts disposed in an upper-and-lower opposing relation and moving the endless belts. In the present invention, continuous compression molding is preferred in view of the workability and the productivity for long material. The pressure used in compression molding can be selected within a wide range, but is desired to be selected within the range of generally 0.01 Mpa to 2 GPa, preferably 1–500 MPa. In the case of continuous compression molding, sufficient compression molding is achieved even at a low pressure of about 0.01–10 Mpa, in some cases, by appropriately selecting the compression molding conditions. The temperature used in compression molding must be lower than the melting point of the ultra-high-molecular-weight polyethylene, and is generally 20° C. to lower than said melting point, preferably 90°–140° C., more preferably 110°–135° C.

In the present invention, the thus obtained compression-molded product is rolled as necessary to be made into a rolled product.

The rolling can be carried out by a known method. The above compression-molded product is passed through, for example, two rolls rotating in opposite directions, in a solid state and is made into a rolled sheet or film. In this case, the degree of dimensional change of material by rolling can be selected within a wide range. Desirably, the rolling efficiency (length after rolling/length before rolling) is 1.2–20, preferably 1.5–10. Desirably, the rolling temperature is generally 20° C. to lower than the melting point of the ultra-high-molecular-weight polyethylene, preferably 50° C. to lower than said melting point, more preferably 90°–140° C., particularly preferably 110°–135° C. The rolling operation may be carried out in two or more stages.

The compression-molded product or the rolled product is then stretched.

Stretching is carried out preferably by tensile stretching. Tensile stretching includes, for example, nip stretching, roll stretching, hot air stretching, cylinder stretching and hot plate stretching. In all of these stretching methods excluding nip stretching, different speeds are given to a pair of nip rolls or crowbar rolls to give rise to stretching.

The temperature used in tensile stretching is lower than the melting point of the material to be stretched, and is generally 20°–160° C., preferably 60°–150° C., more preferably 90°–145° C., particularly preferably 90°–140° C., most preferably 90°–130° C.

The tensile speed differs by the method of tensile stretching, the molecular weight of the ultra-high-molecular-weight polyethylene and the composition of the material (mixture) to be stretched, and accordingly is selected appropriately. In the case of batchwise stretching, the speed is generally 1–500 mm/min, preferably 1–100 mm/min, more preferably 5–50 mm/min. In the case of continuous stretching, the speed is generally 0.1–500 m/min, preferably 1–200 m/min, more preferably 10–200 m/min. A higher speed is preferable in view of the economy.

As a matter of course, the operation of tensile stretching may be carried out in two or more stages.

The stretch ratio in tensile stretching or the total stretch ratio in rolling and tensile stretching is desirably as large as possible (i.e. stretching is carried out to the highest possible extent). In the mixture of the ultra-high-molecular-weight polyethylene powder and the dye and/or the pigment according to the present invention, the stretch ratio is generally 20 or more, preferably 60 or more, more preferably 80–200.

As mentioned above, in the present invention, the compression molding step and the rolling step must be carried out at a temperature lower than the melting point [$T_{m0}$ (°C.)] of the ultra-high-molecular-weight polyethylene powder used. When the compression-molded product obtained by compression molding of $T_{m0}$ or a higher temperature is stretched to a stretch ratio of 20 or more, cutting of material takes place easily.

In the present invention, it is necessary that the melting point [$T_{m1}$ (°C.)] of the polyethylene before stretching, i.e. the polyethylene after compression molding or rolling satisfy the following formula.

$$T_{m1} \geq T_{m0} - 5$$

The above formula does not hold when the polyethylene is melted before the stretching step. Stretching of such a polyethylene causes easy cutting. Even if stretching is possible with such a polyethylene, no improvement in properties can be expected.

By the above process can be obtained a colored stretched polyethylene material of high modulus and high strength, having a tensile modulus of 120 GPa or more and a tensile strength of 1.5 GPa or more in a fiber, sheet or film form.

The colored stretched polyethylene material of the present invention is obtained by effecting the mixing step (wherein a powdery polyethylene as a main component is mixed with a pigment and/or a dye), the compression molding step, (the rolling step) and the tensile stretching step in this order. Therefore, in the present invention, unlike the case wherein a stretched material is colored by simply immersing it in a solution containing a pigment or a dye, the pigment or the dye infiltrates into the interior of the polyethylene and, as a result, the physical bonding between the polyethylene and the pigment and/or the dye becomes strong, causing substantially no color fading. Further, by changing the concentration (amount used) of the pigment or the dye, the degree of coloring (the density of color) can be controlled as desired.

The present invention is hereinafter described specifically by way of Examples. However, the present invention is not restricted to these Examples.

In Examples and Comparative Examples, properties were measured in accordance with the following test methods.

[Melting point]

About 5 mg of a sample was accurately weighed and set in a DSC apparatus. Temperature elevation was made at a rate of 5° C./min. A temperature at the maximum peak obtained was taken as the melting point of the sample.

[Modulus and strength]

Modulus and strength were measured at 23° C. using a tensile tester (STROGRAPH R manufactured by Toyo Seiki).

Modulus: The length of a sample held between clamps was 150 mm, and the tensile speed was 100 mm/min. Modulus was calculated using a stress at 0.1% strain.

Strength: The length of the sample held between clamps was 25 mm and the tensile speed was 15 mm/min. The strength of the sample was taken as a maximum stress shown up to the time when the sample caused breakage.

The cross-sectional area of the sample required for the calculation, was determined by measuring the weight and length of the sample while assuming that the density of polyethylene was 1 g/cm³.

EXAMPLE 1

100 parts by weight of an ultra-high-molecular-weight polyethylene powder (average particle diameter: 240 μm) having a melting point of 143° C. and an intrinsic viscosity of 16.6 dl/g as measured in decalin at 135° C., was mixed with 1 part by weight of Benzidine Yellow for 30 minutes using a tumbler.

The mixture was compression-molded at a pressure of about 100 kg/cm² at 130° C. using a press, to obtain a sheet of 100 mm×100 mm×1.2 mm (thickness).

The melting point of the sheet was 143° C. and was the same as that of the polyethylene powder.

The sheet was fed between a pair of rolls (the gap between rolls: 70 μm, the roll surface temperature: 135° C.) to effect rolling to obtain a rolled sheet having a length 6 times that of the original sheet.

The rolled sheet was cut into a tape of 1 mm in width and 50 mm in length. The tape was subjected to tensile stretching using a tensile tester provided with a constant temperature bath, under the conditions of 135° C. and 50 mm/min (tensile speed), to obtain a stretched polyethylene material homogeneously colored in a yellow color.

The colored stretched polyethylene material gave no color fading when the surface was rubbed. The stretch ratio, tensile strength and modulus of the material are shown in Table 1.

EXAMPLE 2

The same procedure as in Example 1 was repeated except that an ultra-high-molecular-weight polyethylene powder (average particle diameter: 210 μm) having an intrinsic viscosity of 18 dl/g was used and Phthalocyanine Blue was used as a pigment. The polyethylene material obtained was homogeneously colored in a blue color and gave no color fading when the surface was rubbed. The stretch ratio, tensile strength and modulus of the colored stretched polyethylene material are shown in Table 2.

COMPARATIVE EXAMPLE 1

The same procedure as in Example 1 was repeated except that no pigment was used. The stretch ratio, tensile strength and modulus of the stretched polyethylene material obtained are shown in Table 1.

COMPARATIVE EXAMPLE 2

The same procedure as in Example 2 was repeated except that no pigment was used. The stretch ratio, tensile strength and modulus of the stretched polyethylene material obtained are shown in Table 2.

COMPARATIVE EXAMPLE 3

The same procedure as in Example 1 was repeated except that no pigment was used. The uncolored stretched polyethylene material obtained was immersed in an alcohol solution containing 5% of a phthalocyanine dye, at room temperature for 1 hour to examine the effect of coloring. The stretched polyethylene material was slightly colored, but most of the dye was detached by rubbing.

TABLE 1

|  | Stretch ratio | Tensile strength (GPa) | Modulus (GPa) |
| --- | --- | --- | --- |
| Example 1 | 75 | 1.7 | 158 |
| Comparative Example 1 | 76 | 1.7 | 160 |

TABLE 2

|  | Stretch ratio | Tensile strength (GPa) | Modulus (GPa) |
| --- | --- | --- | --- |
| Example 2 | 85 | 1.8 | 172 |
| Comparative Example 2 | 80 | 1.7 | 165 |

EXAMPLE 3

100 parts by weight of an ultra-high-molecular-weight polyethylene powder (average particle diameter: 200 μm) having a melting point of 141.8° C. and an intrinsic viscosity of 18.5 dl/g as measured in decalin at 135° C., was mixed with 1.5 parts by weight of Carmine 6B for 15 minutes using a tumbler.

The mixture was compression-molded continuously by the use of a double belt type continuous compression molding machine (shown in FIG. 1) having the specification described later, under the conditions of 135° C. (temperature) and about 45 kgf/cm² (pressure) to obtain a sheet of 1.1 mm in thickness and 50 mm in width.

In FIG. 1, 1, 2, 3, 4 and 5 are each a roll. Steel belts 6 and 7 are extended between the rolls 1, 2 and 3 and between the rolls 4 and 5, respectively. 8 and 9 are both small-diameter rollers. 10 and 11 are each a pressing platen provided with a heating means inside. 12 is a hopper for accommodation of a mixture of an ultra-high-molecular-weight polyethylene, a dye, etc. The mixture is fed between the pressing platens 10 and 11 via the steel belt 6, and heated and compression-molded by the small-diameter rollers 8 and 9.

Specification of compression molding machine

1. Rolls—diameter: 500 mm, surface length: 300 mm
2. Steel belts—thickness: 0.8 mm, width: 200 mm
3. Small-diameter rollers—diameter: 12 mm, surface length: 250 mm
4. Pressing platen—length: 600 mm, width: 200 mmm Then, the sheet was passed between a pair of rolls (the gap between rolls: 65 μm, the surface temperature: 135° C.) to effect rolling to obtain a rolled sheet having a length 6.5 times that of the original sheet.

The rolled sheet was slitted into a tape of 30 mm in width. The tape was subjected to tensile stretching using a tensile apparatus (shown in FIG. 2) having the specification described later.

Figure 2:
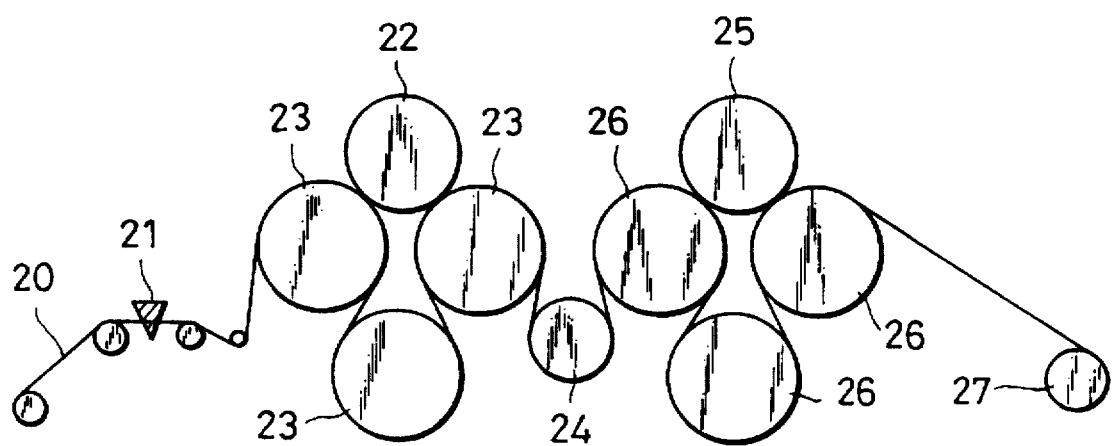
FIG. 2 is a schematic illustration showing an example of the stretching apparatus used in the practice of the present invention.

In FIG. 2, a rolled sheet 20 is passed through a slitter 21; the resulting tape is passed between an inlet side nip roll (rubber roll) 22 and preheating metal rolls 23, and then passed between an outlet side nip roll (rubber roll) 25 and cooling metal rolls 26 via a stretching metal roll 24; the resulting stretched tape is taken up by a take-up bobbin 27.

Specification of stretching apparatus

1. Heating rolls
   Preheating metal rolls—diameter: 250 mmφ, surface length: 200 mm
   Stretching metal roll—diameter: 125 mmφ, surface length: 200 mm A heat transfer oil is circulated inside each roll.

The gap between any two adjacent rolls is 30 mm.

2. Cooling metal rolls—diameter: 250 mmφ, surface length: 200 mm

Water is circulated inside each roll.

3. Nip rolls

Inlet side—A 200 φ silicone rubber roll-nips the two preheating metal rolls.

Outlet side—A 200 φ silicone rubber roll nips the two cooling metal rolls.

The tensile stretching was effected three times under the conditions shown in Table 3. The stretch ratio, strength and modulus of the red colored stretched polyethylene material obtained are shown in Table 4.

TABLE 3

| | Metal roll temperature (°C.) | | Nip roll circumferential speed (m/min) | | Stretch ratio |
|---|---|---|---|---|---|
| | Preheating | Stretching | Inlet | Outlet | (times) |
| First | 135 | 140 | 1 | 4 | 4 |
| Second | 140 | 145 | 4 | 10 | 2.5 |
| Third | 140 | 145 | 10 | 13 | 1.3 |
| Total | | | | | 13 |

TABLE 4

| | Total stretch ratio | Tensile strength (GPa) | Modulus (GPa) |
|---|---|---|---|
| Example 3 | 84.5* | 2.0 | 165 |

* Rolling ratio (6.5) × stretching ratio (13)

EXAMPLE 4

A sheet was obtained in the same manner as in Example 1 except that there was used an ultra-high-molecular weight polyethylene powder (average particle diameter: 135 μm) having a melting point of 140.4° C. and an intrinsic viscosity of 14.7 dl/g as measured in decalin at 135° C. and press molding was effected at 350 kg/cm² (pressure) and at 135° C. (temperature). The sheet was subjected to the same tensile stretching (stretch ratio: 71) as in Example 1 (no rolling step was effected), to obtain a stretched polyethylene material homogeneously colored in a yellow color. No color fading occurred when the surface of the colored stretched polyethylene material was rubbed. The material had a tensile strength of 1.6 GPa and a modulus of 148 GPa.

What is claimed is:

1. A process for producing a colored stretched polyethylene material consisting essentially of an ultra-high-molecular-weight polyethylene having an intrinsic viscosity of 5–50 dl/g in decalin at 135° C. and 0.01–10 parts by weight, per 100 parts by weight of the polyethylene, of a dye and/or pigment, comprising mixing said ultra-high-molecular-weight polyethylene powder and said dye and/or pigment in the defined proportions at a temperature lower than the melting point of said ultra-high-molecular-weight polyethylene, removing substantially any liquid present therein, then directly continuous compression-molding the resulting mixture under a pressure of 0.01–10 MPa and at a temperature lower than the melting point of the ultra-high-molecular-weight polyethylene, rolling the compression-molded product at a temperature lower than said melting point, and stretching the rolled product at a temperature lower than its melting point.

2. The process for producing a colored stretched polyethylene material according to claim 1, wherein the compression-molding temperature is 90°–140° C.

3. The process for producing a colored stretched polyethylene material according to claim 1, wherein the ultra-high-molecular-weight polyethylene has an intrinsic viscosity of 8–40 dl/g in decalin at 135° C.

4. The process for producing a colored stretched polyethylene material according to claim 1, wherein the dye and/or pigment is present in a total amount of 0.01–5 parts by weight per 100 parts by weight of the ultra-high-molecular-weight polyethylene.

5. The process for producing a colored stretched polyethylene material according to claim 1, wherein the total stretch ratio is 20–200.

6. The process for producing a colored stretched polyethylene material according to claim 1, wherein the total stretch ratio is 60–200.

7. The process for producing a colored stretched polyethylene material according to claim 1, wherein the rolling temperature is 90°–140° C.

8. The process for producing a colored stretched polyethylene material according to claim 1, wherein continuous compression molding is conducted by holding the mixture between a pair of endless belts disposed in an upper-and-lower opposing relation and moving the endless belts.

9. The process for producing a colored stretched polyethylene material according to claim 1, wherein mixing is carried out by dry powder mixing.

* * * * *